(12) United States Patent  (10) Patent No.: US 8,336,193 B2
Fukushima et al.  (45) Date of Patent: Dec. 25, 2012

(54) PROCESS FOR MAKING MAGNETIC RECORDING MEDIUM AND MAGNETIC RECORDING-REPRODUCING APPARATUS

(75) Inventors: Masato Fukushima, Ichihara (JP); Akira Sakawaki, Ichihara (JP); Akira Yamane, Ichihara (JP)

(73) Assignee: Showa Denko K.K., Tokyo (JP)

( * ) Notice: Subject to any disclaimer, the term of this patent is extended or adjusted under 35 U.S.C. 154(b) by 215 days.

(21) Appl. No.: 12/671,333

(22) PCT Filed: Jul. 24, 2008

(86) PCT No.: PCT/JP2008/063248
§ 371 (c)(1),
(2), (4) Date: May 27, 2010

(87) PCT Pub. No.: WO2009/017016
PCT Pub. Date: Feb. 5, 2009

(65) Prior Publication Data
US 2010/0232052 A1  Sep. 16, 2010

(30) Foreign Application Priority Data

Jul. 30, 2007 (JP) ................................. 2007-196957

(51) Int. Cl.
*G11B 5/127* (2006.01)
*H04R 31/00* (2006.01)

(52) U.S. Cl. ............... 29/603.06; 29/603.03; 29/603.07; 204/192.1; 216/22; 216/38; 216/52; 216/67; 216/68; 360/77.11; 360/132; 360/135

(58) Field of Classification Search ............... 29/603.03, 29/603.07, 603.09, 603.16, 603.18; 204/192.1; 216/22, 38–40, 52, 67, 88; 360/77.11, 97.02, 360/97.04, 132, 133, 135
See application file for complete search history.

(56) References Cited

U.S. PATENT DOCUMENTS

| | | | |
|---|---|---|---|
| 6,841,224 B2 * | 1/2005 | Kamata et al. | 428/836.3 |
| 7,067,207 B2 * | 6/2006 | Kamata et al. | 428/836 |
| 7,147,790 B2 * | 12/2006 | Wachenschwanz et al. | 216/22 |
| 7,161,753 B2 | 1/2007 | Wachenschwanz et al. | |
| 7,323,258 B2 * | 1/2008 | Kamata et al. | 428/827 |
| 7,549,209 B2 * | 6/2009 | Wachenschwanz et al. | 29/603.01 |

FOREIGN PATENT DOCUMENTS

| | | |
|---|---|---|
| JP | 05-205257 A | 8/1993 |
| JP | 2004-164692 A | 6/2004 |
| JP | 2004-178793 A | 6/2004 |
| JP | 2004-178794 A | 6/2004 |
| JP | 2006-209952 A | 8/2006 |
| JP | 2006-309841 A | 9/2006 |

* cited by examiner

*Primary Examiner* — Paul D Kim
(74) *Attorney, Agent, or Firm* — Sughrue Mion, PLLC

(57) ABSTRACT

Provided is a process for making a magnetic recording medium having a magnetically partitioned magnetic recording patterns, which comprises the following three steps (1), (2) and (3), conducted in this order: (1) a step of forming a magnetic layer on a non-magnetic substrate; (2) a step of removing surface layer portions of regions for magnetically partitioning the magnetic layer; and (3) a step of exposing the thus-exposed regions of the magnetic layer, from which the surface layer portions have been removed, to a reactive plasma or a reactive ion, to modify the magnetic characteristics of the regions of magnetic layer, whereby a magnetic recording pattern is formed which are magnetically partitioned by the regions of magnetic layer having the modified characteristics. Thus, a magnetic recording medium having an enhanced recording density and minimizing letter bleeding at writing can be made with a high efficiency.

7 Claims, 3 Drawing Sheets

Step A

Step B

Step C

Step D

Step E

PROCESS FOR MAKING MAGNETIC RECORDING MEDIUM AND MAGNETIC RECORDING-REPRODUCING APPARATUS

TECHNICAL FIELD

This invention relates to a process for making a magnetic recording medium used for a magnetic recording-reproducing apparatus such as a hard disk apparatus.

BACKGROUND ART

In recent years, magnetic recording apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording medium, the track density has reached about 110 kTPI. However, with an increase of the track density, magnetic recording information is liable to inferring with each other between adjacent tracks, and magnetization transition regions in the boundary regions thereof as noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, when the bit size is decreased, the minimum magnetization volume per bit becomes small, and the recorded data are tend to disappear due to magnetization reversal caused by heat fluctuation.

Further, in view of the reduction in distance between the adjacent tracks, a high-precision track servo system technology is required for the magnetic recording apparatus, and an operation is adopted wherein recording is carried out widely but the reproduction is carried out narrowly so that the influence of the adjacent tracks is minimized. This operation is advantageous in that the influence of the adjacent tracks can be minimized, but disadvantageous in that the reproduction power is rather low. This also leads to difficulty in enhancement of the SNR to a desired level.

To reduce the heat fluctuation, maintain the desired SNR and obtain the desired reproduction of output, a proposal has been made wherein ridges and grooves are formed on a magnetic recording medium so that each of patterned tracks on the ridges is partitioned by the grooves whereby the track density is enhanced. This type of magnetic recording media is hereinafter referred to as a discrete track media, and the technique for providing this type of magnetic recording media is hereinafter referred to as a discrete track method.

An example of the discrete track medium is a magnetic recording medium disclosed in patent document 1, which is made by providing a non-magnetic substrate having protrusions and depressions formed on the surface thereof, and the magnetic layer corresponding surface configuration is formed on the non-magnetic substrate, to give physically discrete magnetic recording tracks and servo signal patterns.

The magnetic recording medium in JP-A 2004-164692 has a structure such that a ferromagnetic layer is formed via a soft magnetic layer on the non-magnetic substrate having protrusions and depressions formed on the surface thereof, and an overcoat is formed on the ferromagnetic layer. The magnetic recording pattered regions form the protrusions partitioned from the surrounding regions.

In the above-mentioned magnetic recording medium, the occurrence of ferromagnetic domain wall in the soft magnetic layer can be prevented or minimized and therefore the influence due to the heat fluctuation is reduced and the interfere between the adjacent signals is minimized with the result of provision of a magnetic recording medium having a large SNR.

The discrete track method includes two type of methods: a first type is drawn to a method wherein tracks are formed after the formation of a multilayer magnetic recording medium comprising several laminated films; and a second type is drawn to a method wherein patterns having protrusions and depressions are formed on a substrate or formed on a film layer for forming tracks thereon, and then a multilayer magnetic recording medium is made using the patterned substrate or film layer (see, for example, patent document 2 and patent document 3).

The first type discrete track method is often called as magnetic layer-fabricating type method. The fabrication of the surface for the formation of patterned tracks is carried out on the once-formed magnetic recording medium, and therefore, has problems such that the magnetic recording medium is liable to be stained in the fabrication course, and the fabrication process is complicated.

The second type discrete track method is often called as an embossing type method. This method does not have the problem of being stained in the fabrication course, but, has a problem such that the pattern with protrusions and depressions, formed on a substrate, influences the surface configuration of the layers formed thereon, and therefore, it influences the stability in floating state of a floating recording-reproducing head and in height of floatation.

Further, other discrete track methods have been proposed in patent document 4, patent document 5 and patent document 6. In these methods, a previously formed magnetic layer of a magnetic recording medium is, for example, subjected to an implantation of nitrogen ion or oxygen ion or irradiated with laser whereby the magnetic characteristics of regions partitioning magnetic tracks are selectively modified.

However, the above-mentioned discrete tack method utilizing modification of regions partitioning magnetic tracks has a problem such that the magnetic layer tends to be damaged by ion implantation or laser irradiation, and further that, although an ion implantation or laser irradiation with high energy is applied, its energy density over the entire magnetic recording medium is low and the time required for achieving the desired degree of modification is long.

Patent document 1 JP 2004-164692 A1
Patent document 2 JP 2004-178793 A1
Patent document 3 JP 2004-178794 A1
Patent document 4 JP H5-205257 A1
Patent document 5 JP 2006-209952 A1
Patent document 6 JP 2006-309841 A1

DISCLOSURE OF THE INVENTION

Problems to be Solved by the Invention

An object of the present invention is to provide a process for easily making a magnetic recording medium characterized as having a greatly increased recording density while recording-reproducing characteristics equal to or better than those of the conventional magnetic recording media can be maintained.

Another object of the present invention is to provide a process for easily making a magnetic recording medium characterized in that the coercive force and residual magnetization of regions partitioning the magnetic recording pattern are reduced to the minimum value whereby the letter bleeding at writing can be suppressed and the areal recording density can be enhanced.

Still another object of the present invention is to provide a magnetic recording-reproducing apparatus such as a discrete track magnetic recording medium or a patterned medium, provided with the magnetic recording medium having the above-mentioned beneficial properties, and exhibiting excellent head-floating properties.

Means for Solving the Problems

To achieve the above-recited objects, the inventors have made extensive efforts and completed the present invention.

In accordance with the present invention, there are provided the following processes for making a magnetic recording medium, and the magnetic recording-reproducing apparatuses.

[1] A process for making a magnetic recording medium having a magnetically partitioned magnetic recording pattern, which is characterized by comprising the following three steps (1), (2) and (3), conducted in this order:

(1) a step of forming a magnetic layer on a non-magnetic substrate;

(2) a step of removing surface layer portions of regions for magnetically partitioning the magnetic layer; and (3) a step of exposing the thus-exposed regions of the magnetic layer, from which the surface layer portions have been removed in step (2), to a reactive plasma or a reactive ion, thereby modifying magnetic characteristics of said regions of magnetic layer regions, whereby magnetic recording patterns are formed which are magnetically partitioned by said regions of magnetic layer having the modified characteristics.

[2] The process for making a magnetic recording medium according to [1] mentioned above, wherein the surface layer portions to be removed in the step (2) have a thickness of in the range of 0.1 nm to 15 nm.

[3] The process for making a magnetic recording medium according to the above-mentioned [1] or [2], wherein the surface layer portions are removed by ion milling in the step (2).

[4] The process for making a magnetic recording medium according to any one of the above-mentioned [1] to [3], wherein said regions of the magnetic layer are exposed to a reactive plasma or a reactive ion in the step (3) to an extent such that the magnetization of the magnetic layer regions having the modified magnetic characteristics is not larger than 75' of the magnetization of the magnetic layer regions having the non-modified magnetic characteristics.

[5] The process for making a magnetic recording medium according to any one of the above-mentioned [1] to [4], wherein said regions of the magnetic layer are exposed to a reactive plasma or a reactive ion in the step (3) to an extent such that the coercive force of the magnetic layer regions having the modified magnetic characteristics is not larger than 50% of the coercive force of the magnetic layer regions having the non-modified magnetic characteristics.

[6] The process for making a magnetic recording medium according to any one of the above-mentioned [1] to [5], wherein the reactive plasma or the reactive ion contains an oxygen ion.

[7] The process for making a magnetic recording medium according to any one of the above-mentioned [1] to [6], wherein the reactive plasma or the reactive ion contains a halogen ion.

[8] The process for making a magnetic recording medium according to [7], wherein the halogen ion is a halogen ion formed by introducing a halogenated gas into a reactive plasma, said halogenated gas being at least one halogenated gas selected from the group consisting of $CF_4$, $SF_6$, $CHF_3$, $CCl_4$ and KBr.

[9] The process for making a magnetic recording medium according to the above-mentioned [7], wherein the halogen ion is a fluorine ion.

[10] A process for making a magnetic recording medium having a magnetically partitioned magnetic recording pattern, which is characterized by comprising the following seven steps (1) through (7), conducted in this order:

(1) a step of forming a magnetic layer on a non-magnetic substrate;

(2) a step of forming a masking layer on the magnetic layer;

(3) a step of forming a resist layer on the masking layer;

(4) a step of forming on the resist layer a magnetic recording pattern for partitioning the magnetic layer into divided regions;

(5) a step of removing the masking layer in the regions corresponding to the magnetic layer-partitioning regions in the magnetic recording patterns;

(6) a step of removing surface layer portions of the magnetic layer, which portions have been exposed by the removal of the regions of masking layer in step (5); and (7) a step of exposing the thus-exposed regions of magnetic layer, from which the surface layer portions have been removed in step (6), to a reactive plasma or a reactive ion, thereby modifying the magnetic characteristics of said regions of magnetic layer, whereby a magnetic recording pattern is formed which is magnetically partitioned by said regions of magnetic layer having the modified characteristics.

[11] A magnetic recording reproducing apparatus characterized by comprising, in combination, the magnetic recording medium produced by the process for producing the magnetic recording medium as mentioned in any one of the above-mentioned [1] to [10]; a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproduction of output signal from the magnetic head.

Effect of the Invention

According to the present invention, a magnetic recording medium is made in an industrially advantageous manner by a process wherein a magnetic recording pattern is formed after a magnetic layer is formed on a non-magnetic substrate. The resulting magnetic recording medium is characterized in that the magnetic recording pattern is partitioned by the regions exhibiting excellent partitionability and the signal interferes occurring between the adjacent regions in the pattern are suppressed, and further that the high recording density can be achieved.

The magnetic recording medium produced by the process of the present invention has a flat and smooth surface and exhibits a good head-floatability at a low floating height.

REFERENCE NUMERALS

Figure 1:
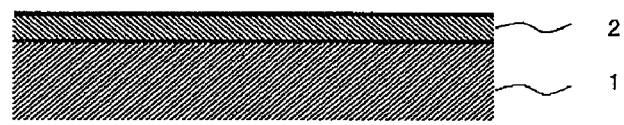
FIG. 1 is a flow-sheet of the first-half steps for producing a magnetic recording medium according to the present invention.
Figure 1:
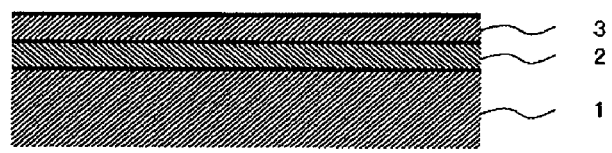
Figure 1:
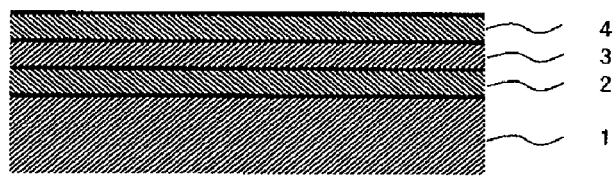
Figure 1:
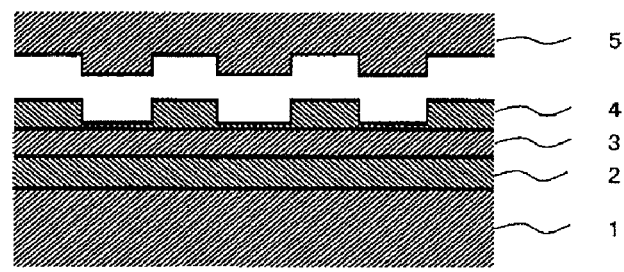
Figure 1:
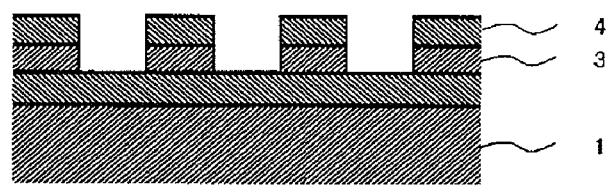

1 Non-magnetic substrate
2 Magnetic layer
3 Masking layer
4 Resist layer
5 Stamp
6 Milling ion
7 Region from which surface layer portions of the magnetic layer have been partially removed
    d: Depth of the region from which surface layer portions of the magnetic layer have been partially removed
8 Region of magnetic layer, having modified magnetic characteristics
9 Protective film
11 Medium-driving part
27 Magnetic head
28 Head driving part
29 Recording-reproducing signal system
30 Magnetic recording medium

BEST MODE FOR CARRYING OUT THE INVENTION

The present invention is concerned with a process for making a magnetic recording medium comprising a non-magnetic substrate having a magnetically partitioned magnetic recording pattern formed on at least one surface of the substrate.

The process of the present invention for making a magnetic recording medium having a magnetically partitioned magnetic recording pattern is characterized by comprising the following three steps (1), (2) and (3), conducted in this order:

(1) a step of forming a magnetic layer on a non-magnetic substrate;
(2) a step of removing surface layer portions of regions for magnetically partitioning the magnetic layer; and
(3) a step of exposing the thus-exposed regions of the magnetic layer, from which the surface layer portions have been removed in step (2), to a reactive plasma or a reactive ion, thereby modifying the magnetic characteristics of said regions of magnetic layer, whereby a magnetic recording pattern is formed which is magnetically partitioned by said regions of magnetic layer having the modified characteristics.

More specifically the process of the present invention is characterized by comprising the following seven steps (1) through (7), conducted in this order:

(1) a step of forming a magnetic layer on a non-magnetic substrate;
(2) a step of forming a masking layer on the magnetic layer;
(3) a step of forming a resist layer on the masking layer;
(4) a step of forming on the resist layer a magnetic recording pattern for partitioning the magnetic layer into divided regions;
(5) a step of removing the masking layer in the region corresponding to the magnetic layer-partitioning regions in the magnetic recording patterns;
(6) a step of removing surface layer portions of the magnetic layer, which portions have been exposed by the removal of the masking layer regions in step (5); and
(7) a step of exposing the thus-exposed regions of magnetic layer, from which the surface layer portions have been removed in step (6), to a reactive plasma or a reactive ion, thereby modifying the magnetic characteristics of said regions of magnetic layer regions, whereby a magnetic recording pattern is formed which is magnetically partitioned by said regions of magnetic layer having the modified characteristics.

The magnetic recording medium made by the process of the present invention has a magnetically partitioned magnetic recording pattern, and regions for magnetically partitioning the magnetic recording pattern. The regions for magnetically partitioning the magnetic recording pattern are characterized as being formed by a method of removing surface layer portions of the magnetic layer, for example, by ion milling, which surface portions correspond to the negative patterns of the desired magnetic recording pattern, and then, exposing the region, thus-exposed by the removal of surface layer portions, to a reactive plasma or a reactive ion, thereby modifying the magnetic characteristics of said portion exposed by the removal of surface layer portions, more specifically, the magnetization and the coercive force of said portions are reduced due to reduction of crystallinity or other factors.

The process of the present invention is advantageous in that the regions for magnetically partitioning the magnetic recording pattern are formed by removing surface layer portions of the magnetic layer, for example, by ion milling, wherein the removal of the surface layer portions can be minimized, and dust occurs only to a minor extent, and the damage caused by introduction of ions can be avoided or minimized.

By the term "magnetic recording patterns" as used in this specification is meant a magnetic recording pattern in a broad sense which include patterned media wherein a magnetic recording pattern are arranged with a certain regularity per bit; media wherein magnetic recording patterns are arranged in tracks fashion; and servo signal patterns.

The process of the present invention is preferably adopted for the manufacture of a discrete type magnetic recoding medium in view of simplicity and ease, wherein the magnetically partitioned magnetic recording pattern involves magnetic recoding tracks and servo signal patterns.

The process for making the magnetic recording medium according to the present invention will be specifically described with reference to the accompanying FIG. 1 and FIG. 2.

Figure 2:
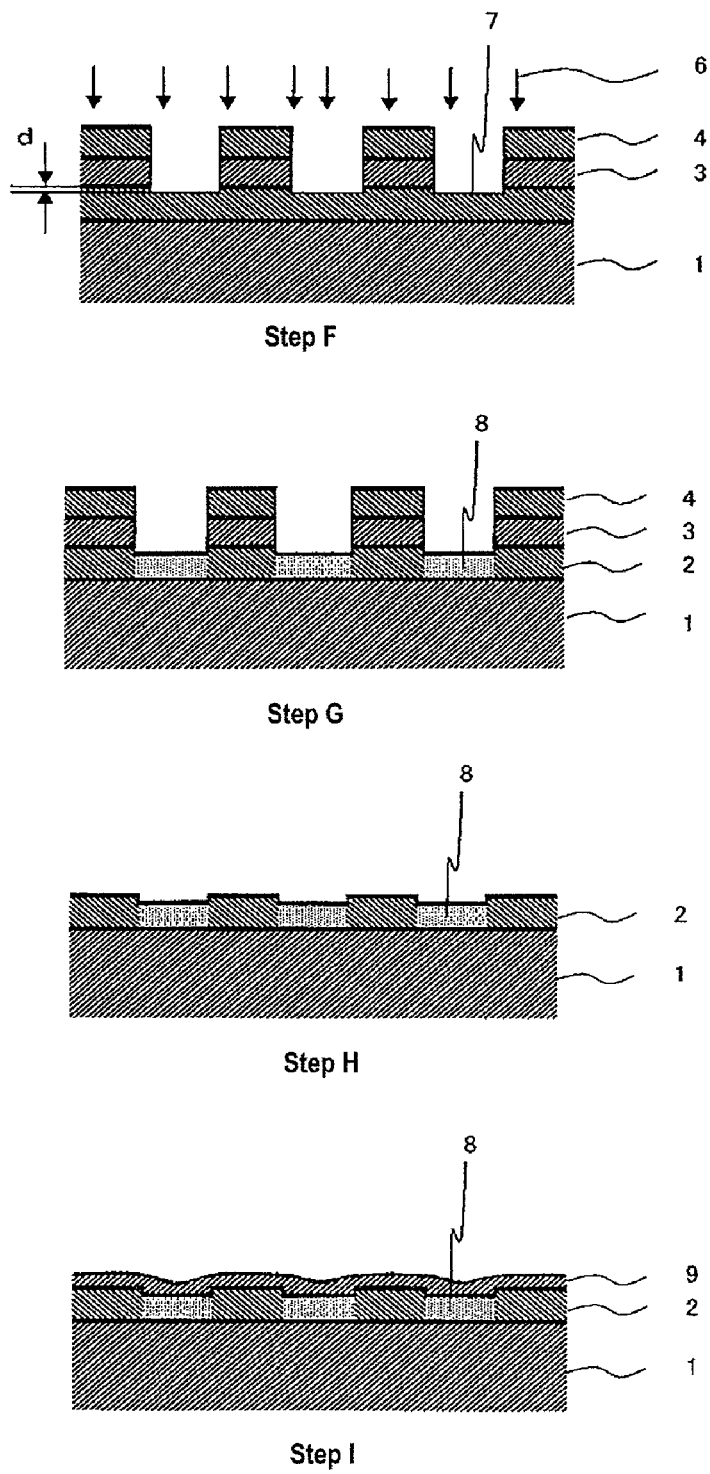
FIG. 2 is flow-sheet of the second-half steps for producing a magnetic recording medium according to the present invention.

The magnetic recording medium made has a structure as illustrated in, for example, step I in FIG. 2 which comprises a non-magnetic substrate 1, a magnetic layer 2 formed on the substrate and having a magnetic recording pattern, and an overcoat 9, which are formed in this order. If desired, a lubricating film (not shown in FIG. 2) is formed on the overcoat. In the magnetic recording medium of the present invention, a non-magnetic substrate 1 and a magnetic layer 2 are essential but the other layers can be appropriately arranged according to the need. In FIG. 1, a non-magnetic substrate 1, a magnetic layer 2 and an overcoat 9 are shown but other layers are omitted. Although not shown in FIG. 1 and FIG. 2, a soft magnetic layer and an intermediate layer are usually formed on the non-magnetic substrate, and further a magnetic layer 2 having a magnetic pattern is formed thereon.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2 formed on the non-magnetic substrate 1 may be either an in-plane magnetic layer or a perpendicular magnetic layer. A perpendicular magnetic layer is preferable in view of more enhanced recording density.

The magnetic layer is preferably formed from an alloy predominantly comprised of cobalt. As specific examples of the alloy, a 60Co-15Cr-15Pt alloy and a 70Co-5Cr-15Pt-10$SiO_2$ alloy are mentioned.

For the formation of the magnetic layer on a non-magnetic substrate in a perpendicular magnetic recording medium, if desired, a soft magnetic layer (underlayer), an orientation-controlling layer, and an intermediate layer such as ruthenium film are formed in this order on the non-magnetic substrate prior to the formation of the magnetic layer. As specific examples of the material for forming the soft magnetic layer (underlayer), there can be mentioned FeCo alloys such as FeCoB, FeCoSiB, FeCoZr, FeCoZrB and FeCoZrBCu; FeTa alloys such as FeTaN and FeTaC; and Co alloys such as CoTaZr, CoZrNB and CoB. The orientation-controlling layer formed on the soft magnetic layer can be made from, for example, Pt, Pd, NiCr or NiFeCr. The intermediate layer, if desired, formed on the orientation-controlling layer can be formed from, for example, ruthenium.

The magnetic layer as used for an in-plane magnetic recording medium includes, for example, a laminar structure comprised of a non-magnetic CrMo underlayer and a ferromagnetic CoCrPtTa magnetic layer.

Usually the magnetic layer is formed as a film form by sputtering.

The magnetic layer usually has a thickness in the range of 3 nm to 20 nm, preferably 5 nm to 15 nm. The magnetic layer is formed so that sufficiently high input and output head powers can be obtained in consideration of the kind of magnetic alloy and the laminar structure. The magnetic layer has a thickness of at least certain value so as to obtain an output power of at least certain level at reproduction. However, parameters relating to the recordation-reproduction characteristics are generally deteriorated with an increase of the output power. Therefore an optimum thickness of magnetic layer is preferably chosen in consideration of the output power and the recordation-reproduction characteristics.

The process for producing the magnetic recording medium according to the present invention as specifically exemplified in FIG. 1 and FIG. 2 comprises the following steps A through H.

Step A of forming at least magnetic layer 2 on a non-magnetic substrate.

Step B of forming a masking layer 3 on magnetic layer 2.

Step C of forming a resist layer 4 on masking layer 3.

Step D of transferring a negative magnetic recording pattern onto the resist layer 4 by using a stamp 5. The arrow in FIG. 1 refers to the direction in which the stamp 5 moves.

Step E of selectively removing the regions of the masking layer 3, corresponding to the negative magnetic recording patterns of the magnetic recording pattern.

Step F of partially ion-milling 6 the regions of the surface layer of magnetic layer 2, corresponding to the regions from which masking layer 3 is partially removed, and removing the ion-milled regions. Reference numeral 7 indicates the ion-milled regions of the surface layer of magnetic layer, and reference letter d indicates the thickness of the surface layer portions of magnetic layer which have been removed by ion-milling.

Step G of exposing the ion-milled regions 7 of the magnetic layer, from which the surface layer portions of magnetic layer have been removed, to a reactive plasma or a reactive ion, thereby modifying the magnetic characteristics of said regions 7 of magnetic layer. Reference numeral 8 indicates the regions of the magnetic layer which have modified magnetic characteristics.

Step H of removing resist layer 4 and masking layer 3.

Step I of forming an overcoat 9 on the exposed surface of magnetic layer 2.

The masking layer 3, formed on the magnetic layer 2 in the step B in the process for producing the magnetic recording medium according to the present invention, is formed preferably from at least one material selected from Ta, W, Ta nitride, W nitride, Si, $SiO_2$, $Ta_2O_5$, Re, Mo, Ti, V, Nb, Sn, Ga, Ge, As and Ni. By using these materials, the shieldability of the masking layer 3 against milling ion 6 can be enhanced and the formability of the magnetic recording pattern by the masking layer 3 can also be enhanced. These materials can easily be removed at dry etching step using reactive gas, and therefore, in the step H shown in FIG. 2, residual masking layer can be minimized and staining of the exposed surface of magnetic recording medium layer can be avoided.

Among the masking layer-forming materials used in the masking layer-forming step B, As, Ge, Sn and Ga are preferable. Ni, Ti, V and Nb are more preferable, and Mo, Ta and W are most preferable.

When negative magnetic recording pattern is transferred onto the resist layer 4, formed in the step C, by using a stamp 5 as illustrated in the step D, the stamping is preferably carried out under conditions such that the regions of the resist layer 4, pressed by the stamping, have a thickness of not larger than 10 nm. By carrying out the stamping under such conditions, when the regions of the masking layer 3, corresponding to the negative magnetic recording pattern of magnetic recording pattern, are selectively removed by etching in the step E, the etching can be effected in an advantageous manner. That is, undesirable sagging at edge portions of the masking layer 3 can be avoided and the shieldability of the masking layer 3 against milling ion 6 can be enhanced, and the formability of the magnetic recording pattern by the masking layer 3 also is enhanced.

In a preferred embodiment, as the material for forming the resist layer 4 in the step C in FIG. 1, a material which can be cured upon irradiation with radiation is used; and, when negative magnetic recording pattern is transferred onto the resist layer 4 by using a stamp 5 in the step D, or after the transfer of negative magnetic recording pattern has been completed, the resist layer 4 is irradiated with radiation. In this preferred embodiment, the configuration of stamp 5 can be transferred on the resist layer 4 with high precision. Consequently, when the regions of the masking layer 3, corresponding to the negative magnetic recording pattern of the magnetic recording pattern, are removed by etching in the step E in FIG. 1, undesirable sagging at edge portions of the masking layer 3 can be avoided and the shieldability of the masking layer 3 against milling ion 6 can be enhanced, and the formability of the magnetic recording pattern by the masking layer 3 can also be enhanced.

The radiation used for curing the curable material refers to electromagnetic waves in a broad sense which include heat rays, visible light, ultraviolet light, X rays and gamma rays. The curable material includes thermosetting resins which are curable by heat rays, and ultraviolet-setting resins which are curable by ultraviolet light.

In the process for producing the magnetic recording medium of the present invention, in the step D of transferring negative magnetic recording patterns onto the resist layer 4 by using stamp 5, it is preferable that the stamp is pressed on the resist layer 4 having fluidity, and, while the resist layer is in the pressed state, the resist layer 4 is irradiated with radiation to be thereby cured, and thereafter the stamp 5 is removed from the resist layer 4. By this procedure, the configuration of the stamp can be transferred to the resist layer 4 with a high precision.

For irradiating the resist layer having fluidity with radiation while the resist layer is in the pressed state, there can be adopted a method of irradiating a laminated structure comprising the resist layer with radiation by exposing the substrate side (i.e., side opposite to the stamp-pressed resist layer) of the laminate structure to radiation; a method of using a radiation-transmitting stamp, and exposing the stamp-pressed side of the laminated structure to radiation; and a method of using radiation exhibiting a high conductivity to a solid, such as heat rays, and exposing the stamp-pressed side of the laminated structure or the opposite side (substrate side) thereof, with the highly thermoconductive radiation.

In a preferred specific example of the procedure of irradiating the radiation-curable resist layer with radiation to cure the resist layer, an ultraviolet ray-curable resin such as novolak resin, an acrylic acid ester resin or a cycloaliphatic epoxy resin is used as the radiation-curable resist resin, and a stamp made of a highly ultraviolet ray-transmitting glass or resin is used.

By adopting the above-mentioned procedures, the coercive force and the residual magnetization in the regions of partitioning the magnetic tracks can be reduced to the minimum values, and consequently, the letter bleeding at writing can be avoided and the plane recording density of the magnetic recording medium can be enhanced to greater extent.

The stamp used in the pattern-transferring step D is preferably made by forming minute track patterns on a metal plate by electron beam lithography. The material used for forming the stamp is not particularly limited, provided that the purpose of the invention is not impaired, but, a material having a hardness sufficient for enduring over the process for producing the magnetic recoding medium, and having good durability, is preferably used. Such material includes, for example, nickel. The patterns formed on the stamp include those which are conventionally used tracks for recording ordinary data, and further include patters for servo signal, such as burst patterns, gray code patterns and preamble patterns.

The present invention is characterized in that the regions of the magnetic layer, which magnetically partition the magnetic recording tracks and servo signal patterns from each other are exposed to a reactive plasma or a reactive ion whereby the magnetic characteristics of the regions of magnetic layer are modified.

That is, as illustrated in the step F in FIG. 2, the surface layer portions in the regions of the magnetic layer are removed by, for example, ion-milling, and thereafter, the newly exposed regions are exposed to a reactive plasma or a reactive ion, whereby the magnetic characteristics of said regions are modified. The magnetic recording medium having such regions with modified magnetic characteristics has magnetic recording patterns exhibiting clear contrast and has a high SNR, as compared with those of the conventional magnetic recording medium which does not have regions with modified magnetic characteristics, and which has been prepared by a method wherein the surface layer portions in the regions of magnetic layer are not removed and the exposure of said regions to a reactive plasma or a reactive ion is not carried out. This would be for the following reasons. First, by the removal of the surface layer portions in the regions of magnetic layer, the newly exposed regions are clear and activated, and therefore, exhibit enhanced reactivity with a reactive plasma and a reactive ion; and secondly, surface defects such as minute voids are formed in the newly exposed regions into which a reactive plasma or ion can be easily penetrated.

The thickness of the regions of the surface layer of magnetic layer to be removed by, for example, ion-milling, is preferably in the range of 0.1 nm to 15 nm, more preferably 1 nm to 10 nm. When the thickness of the removed regions is smaller than 0.1 nm, the above-mentioned benefits brought about by the removal of said regions are insufficient. In contrast, when the thickness of the removed regions is larger than 15 nm, the resulting magnetic recording medium has a poor surface smoothness and the magnetic recording-reproducing apparatus has a poor head-floating property.

The term "magnetically partitioned magnetic recording pattern" as used in the present specification is meant, as illustrated in FIG. 2, step G, the magnetic recording pattern which is partitioned by the modified or non-magnetized regions 8 of the magnetic layer 2 as seen when the laminated structure is viewed from the front side. The object of the present invention can be achieved in an embodiment wherein, in the case when the magnetic layer 2 is partitioned by the modified or non-magnetized regions 8 thereof in the upper surface portion of the magnetic layer 2, even though the magnetic layer 2 is not partitioned in the lowermost portion thereof. Therefore this embodiment also falls within the scope of the magnetically partitioned magnetic recording pattern as herein used.

The modification of the magnetic layer as conducted for forming the magnetic recording pattern in the present invention refers to at least partially changing the magnetic characteristics (more specifically, lowering the coercive force and residual magnetization) of the magnetic layer in specified regions thereof for the formation of magnetic recording pattern.

The modification of the characteristics, i.e., lowering of the coercive force and residual magnetization, is carried out in the present invention to an extent such that the magnetization of the regions exposed to a reactive plasma or a reactive ion is preferably not larger than 75%, more preferably not larger than 50%, of the magnetization of the non-modified regions; or the coercive force of the regions exposed to a reactive plasma or a reactive ion is preferably not larger than 50%, more preferably not larger than 20%, of the coercive force of the non-modified regions.

The discrete tracks type magnetic recording medium made by the above-mentioned lowering of the coercive force and residual magnetization of the regions partitioning the magnetic recording pattern exhibit minimized letter bleeding at writing and has an enhanced areal recording density.

The above-mentioned benefits can also be achieved by partially changing the crystalline structure of the magnetic layer (more specifically, by rendering the magnetic layer non-crystalline) in specified regions thereof by exposing said specified regions to a reactive plasma or a reactive ion for the formation of the regions for magnetically partitioning the magnetic recording tracks and servo signal patterns. Thus the modification of the magnetic layer as conducted for forming the magnetic recording pattern in the present invention further refers to partially modifying the crystalline structure of the magnetic layer in the specified regions thereof.

The rendering the magnetic layer non-crystalline in the present invention refers to that the atomic arrangement in the magnetic layer is changed to an irregular atomic arrangement with no long-distance order. More specifically it refers to that microcrystalline particles having a size of smaller than 2 nm are arranged in random. This arrangement in random of the microcrystalline particles can be confirmed by the absence of peaks attributed to the crystalline plane or by the presence of halo alone by X-ray diffraction analysis or electron-ray diffraction analysis.

The reactive plasma as used in the present invention includes, for example, inductively coupled plasma (ICP) and reactive ion plasma (RIP). The reactive ion as used in the present invention includes, for example, reactive ions present in the above-mentioned inductively coupled plasma and reactive ion plasma.

The inductively coupled plasma as used herein refers to a high-temperature plasma which is obtainable by imposing a high voltage to a gas to thereby form plasma, and further applying magnetic variation at a high frequency to generate joule heat due to over-current inside the plasma. The inductive coupled plasma has a high electron density, and, can modify the magnetic characteristics of magnetic layer with a high efficiency in a broad-area magnetic film, as compared with the case of making discrete track media conventionally using an ion beam.

The reactive ion plasma as used herein refers to a highly reactive plasma which is obtainable by adding a reactive gas such as $O_2$, $SF_6$, $CHF_2$, $CF_4$ or $CCl_4$ in a plasma. When such reactive ion plasma having a reactive gas added is used in the process of the present invention, said plasma can modify the magnetic characteristics of the magnetic layer with a higher efficiency.

In the process of the present invention, the magnetic characteristics of the magnetic layer are modified by exposing the magnetic layer to the reactive plasma. This modification is effected preferably by the reaction of magnetic metal constituting the magnetic layer with an atom or an ion within the reactive plasma. The reaction of the magnetic metal with the atom or ion is accompanied by, for example, penetration of atoms of the reactive plasma into the magnetic metal with the results of modification of the crystalline structure of the magnetic metal, change of the composition of the magnetic metal, and oxidation, nitridation and/or silicification of the magnetic metal.

A reactive plasma containing oxygen atoms is preferably used as the reactive plasma in the present invention whereby the magnetic metal constituting the magnetic layer is allowed to react with the oxygen atoms within the reactive plasma to oxidize specified regions of the magnetic layer. By the oxidation of the specific regions of magnetic layer, the residual magnetization and the coercive force can be reduced with more enhanced efficiency. That is, the magnetic recording medium having magnetically partitioned magnetic recording pattern can be made by a reactive plasma treatment of a short time.

A reactive plasma containing a halogen ion is also preferably used as the reactive plasma in the present invention. The halogen ion is preferably a halogen ion yielded by introducing a halogenated gas into the reactive plasma, which gas is at least one selected from the group consisting of $CF_4$, $SF_6$, $CHF_3$, $CCl_4$ and KBr. As the halogen ion, a fluorine ion is especially preferable.

The halogen ion may be present as a combination thereof with an oxygen ion in the reactive plasma. As mentioned above, the magnetic characteristics of the magnetic layer can be modified with an enhanced efficiency by the reaction of the oxygen ion in the reactive plasma with the magnetic metal constituting the magnetic layer, and therefore, the efficiency of modification can be far improved by the combination of the oxygen ion with the halogen ion in the reactive plasma.

Even in the case when the reactive plasma contains a halogen ion but does not contain an oxygen ion, the halogen ion reacts with the magnetic metal in the magnetic layer to modify the magnetic characteristics of the magnetic layer. The reason for which is not clear, but it is presumed that the halogen ion in the reactive plasma etches foreign matter formed on the surface of the magnetic layer to make clean the surface of the magnetic layer with the result of enhancement of the reactivity of the magnetic layer. Further the clean surface of the magnetic layer is presumed to react the halogen ion with a high efficiency. This beneficial effect is especially markedly obtained when a fluorine ion is used as the halogen ion.

After the modification of the specified regions of the magnetic layer is carried out, the resist layer 4 and the masking layer 3 are removed as illustrated in the step H in FIG. 2, and then an overcoat 9 is formed as illustrated in the step I. If desired, the formation of the overcoat can be omitted. Further, the exposed upper surface of the laminated structure may or may not be coated with a lubricating material (not shown in FIG. 2).

In the step H for removing the resist layer 4 and the masking layer 3 after the treatment with the reactive plasma or reactive ion, said removal of the resist layer 4 and the masking layer 3 can be carried out by, for example, a procedure of dry etching, reactive ion etching, ion milling or wet etching.

The optional overcoat 9 can be formed from a material conventionally used for the general overcoats, which includes, for example, carbonaceous materials such as carbon (C), hydrogenated carbon ($H_xC$), nitrided carbon (CN), amorphous carbon and silicon carbide (SiC); and $SiO_2$, $Zr_2O_3$ and TiN. Two or more overcoats may be formed.

The formation of the overcoat 9 can be usually effected by forming a diamond like carbon film by, for example, using P-CVD, but the method for forming the overcoat is not particularly limited.

The thickness of the overcoat 9 is below 10 nm. If the thickness of the protective layer is larger than 10 nm, the distance between the head and the magnetic layer becomes undesirably large and the input and output powers are often insufficient.

A lubricating layer is preferably formed on the overcoat 9. The lubricating layer is formed from, for example, a fluorine-containing lubricant, a hydrocarbon lubricant or a mixture thereof. The thickness of the lubricating layer is usually in the range of 1 to 4 nm.

Figure 3:
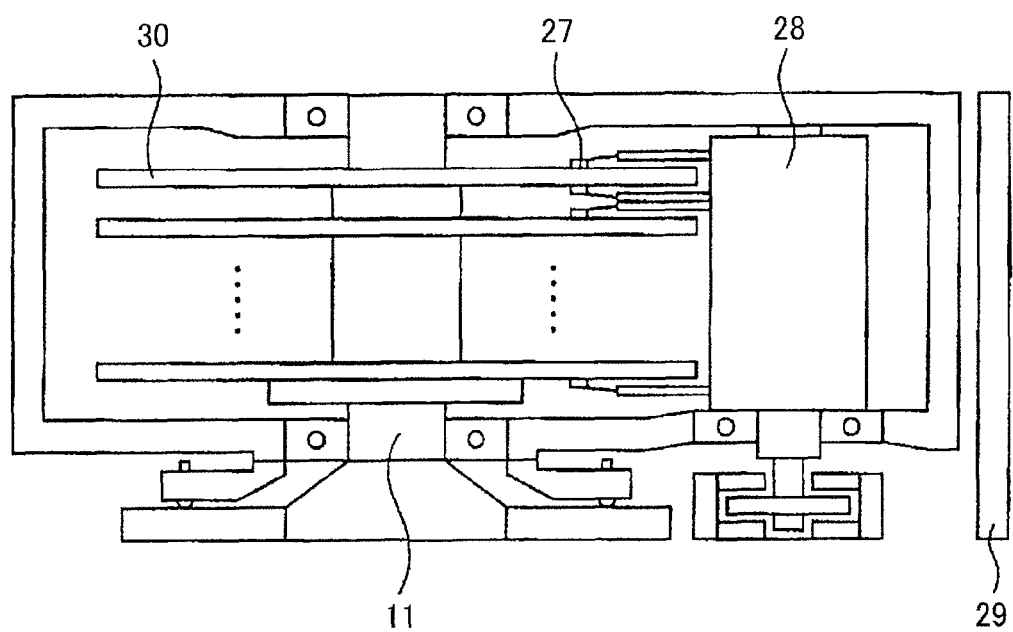
FIG. 3 is a schematic illustration of the magnetic recording-reproducing apparatus of the present invention.

The constitution of an example of the magnetic recording-reproducing apparatus according to the present invention is illustrated in FIG. 3. The magnetic recording-reproducing apparatus of the present invention comprises, in combination, the above-mentioned magnetic recording medium 30 of the invention; a driving part 11 for driving the magnetic recording medium in the recording direction; a magnetic head 27 comprising a recording part and a reproducing part; means (head-driving part 28) for moving the magnetic head 27 in a relative motion to the magnetic recording medium 30; and a recording-and-reproducing signal treating means 29 for inputting signal into the magnetic head 27 and for reproduction of output signal from the magnetic head 27.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, that is, the recording density of the magnetic recording apparatus can be provided. When the head is floated at a floating height in the range of 0.005 μm to 0.020 μm, which is lower than the conventionally adopted floating height, the output power is increased and the SNR becomes large, and the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a high recording density of at least 100 G-bit or more per square inch, a tack density of 100 k-tracks or more per inch, a linear recording density of 1000 k-bit or more per inch.

EXAMPLES

The invention will now be specifically described by the following examples.

Example 1

A glass substrate for HD was placed in a vacuum chamber and the chamber was vacuumed to a pressure of not higher than $1.0 \times 10^{-5}$ Pa to remove the air. The glass plate used is comprised of glass ceramics having a composition of $Li_2Si_2O_5$, $Al_2O_3$—$K_2O$, $Al_2O_3$, —$K_2O$, MgO—$P_2O_5$ and $Sb_2O_3$—ZuO, and has an outer diameter of 65 mm and an inner diameter of 20 mm, and an average surface roughness (Ra) of 2 angstroms.

On the glass substrate, a soft magnetic layer composed of FeCoB, an intermediate layer composed of Ru and a magnetic layer composed of 70Co-5Cr-15Pt-10SiO$_2$ alloy were formed in this order by DC sputtering. The thicknesses of respective layers are: FeCoB soft magnetic layer: 600 angstroms, Ru intermediate layer: 100 angstroms and magnetic layer: 150 angstroms.

A masking layer composed of Ta with a thickness of 60 nm was formed on the laminated structure by sputtering. Then a resist layer composed of ultraviolet ray-curable novolak resin with a thickness of 100 nm was formed on the masking layer by spin-coating.

A glass stamp having a negative pattern corresponding to the desired magnetic recording pattern was pressed to the resist layer at a pressure of 1 MPa (about 8.8 kgf/cm$^2$). The glass of the stamp had an ultraviolet-ray transmission of at least 95%. In the-thus pressed state, the pressed upper side of the resist layer was irradiated with ultraviolet rays with a wavelength of 250 nm for 10 seconds to cure the resist layer. Thereafter the stamp was separated from the cured resist layer thereby transferring magnetic recording pattern on the resist layer. The thus-transferred magnetic recording pattern had a configuration such that the protrusions in the resist layer are circular with a width of 120 nm, and the depressions in the resist layer are circular with a width of 60 nm. The thickness of the resist layer was 80 nm and the thickness of the depressed portions of the resist layer was about 5 nm. The depressed portions had an angle of about 90 degrees to the substrate surface.

Thereafter, the pressed depressed portions of the resist layer and the corresponding portions of the Ta masking layer were removed by dry etching. The dry etching conditions for etching the resist layer were: O$_2$ gas: 40 sccm, pressure: 0.3 Pa, high-frequency plasma power: 300 W, DC bias: 30 W, and etching time: 10 seconds. The dry etching conditions for etching the Ta masking layer were: CF$_4$ gas: 50 sccm, pressure: 0.6 Pa, high-frequency plasma power: 500 W, DC bias: 60 W, and etching time: 30 seconds.

Then exposed regions of the magnetic layer which were not covered by the masking layer were removed by ion milling using an argon ion. The amount of ion was $5 \times 10^{16}$ atoms/cm$^2$, and the accelerating voltage was 20 keV. The milling depth of the magnetic layer (i.e., the thickness of the removed surface layer portions of the magnetic layer) was 0.1 nm.

Then the regions exposed by the ion milling were exposed to a reactive plasma whereby the magnetic characteristics of said regions of the magnetic layer were modified. This modification using a reactive plasma was carried out by using an inductively coupled plasma apparatus "NE550" available from Ulvac, Inc. The plasma was generated by O$_2$ gas at 90 cc/minute. The input power for plasma generation was 200 W, the pressure within the apparatus was 0.5 Pa and the treating time for the magnetic layer was 300 seconds.

Thereafter the resist layer and the masking layer were removed by dry etching, and then, the newly exposed upper surface was covered with a carbon overcoat having a thickness of 5 nm by a CVD method. Further, the upper surface of the overcoat was coated with a lubricating material to give a magnetic recording medium. The production conditions adopted are recited in Table 1, below.

Examples 2 to 11

By substantially the same procedures and conditions as employed in Example 1, magnetic recording mediums were made wherein the milling depth of the magnetic layer (i.e., the thickness of the removed surface layer portions of the magnetic layer) was changed as shown in Table 1, below. All other conditions remained the same. The making conditions employed are shown in Table 1.

Comparative Example 1

By substantially the same procedures and conditions as employed in Example 1, a magnetic recording medium was made wherein the ion-milling of the magnetic layer was not carried out with all other conditions remaining the same. The production conditions adopted are shown in Table 1.

Comparative Example 2

By substantially the same procedures and conditions as employed in Example 1, a magnetic recording medium was made wherein the ion-milling of the magnetic layer and the modification treatment of the magnetic layer by a reactive plasma were not carried out with all other conditions remaining the same. The making conditions employed are shown in Table 1.

The magnetization, coercive force, electromagnetic conversion characteristics (SNR and 3T-squash), and head-floating height (glide avalanche) of the magnetic recording mediums made in Examples 1 to 11 and Comparative Examples 1 and 2 were measured.

The magnetization and coercive force, as measured on the regions where the surface layer portions of the magnetic layer were removed by ion-milling and the modification treatment thereof was carried out by a reactive plasma, were expressed in terms of % as the magnetization and coercive force of a comparative magnetic recording medium being 100%. The comparative magnetic recording medium was made without removal of the surface layer portions of the magnetic layer by ion-milling and without the modification treatment of the magnetic layer by a reactive plasma in Comparative Example 2

The evaluation of the electromagnetic conversion characteristics was carried out using a spin stand. As the head for evaluation, a perpendicularly recording head for recording and a TuMR head for reading were used, and, when a signal of 750 kFCl was recorded, SNR and 3T-squash were measured.

The evaluation results are shown in Table 1.

The invention claimed is:

1. A process for making a magnetic recording medium having a magnetically partitioned magnetic recording pattern, which is characterized by comprising the following three steps (1), (2) and (3), conducted in this order:
   (1) a step of forming a magnetic layer on a non-magnetic substrate;
   (2) a step of removing surface layer portions of regions of the magnetic layer for magnetically partitioning the magnetic layer by ion milling; and
   (3) a step of exposing the regions of the magnetic layer, from which the surface layer portions have been removed in step (2), to a reactive plasma or a reactive ion, thereby modifying magnetic characteristics of said regions of magnetic layer, while magnetic characteristics of other regions of the magnetic layer are not modified, whereby a magnetic recording pattern is formed which is magnetically partitioned by said regions of magnetic layer having the modified characteristics,
   wherein exposure of the regions of magnetic layer to the reactive plasma or the reactive ion is carried out to an extent such that the magnetization of the regions of the magnetic layer having the modified characteristics is not larger than 75% of the magnetization of the other regions of the magnetic layer having the non-modified magnetic characteristics, or to an extent such that the coercive force of the regions of the magnetic layer having the

TABLE 1

| Example | Ion-milling depth (nm) | Conditions for modifying magnetic layer | | | | Magnetization (%) after treatment | Coercive force (%) after treatment | SNR (dB) | 3T-squash (%) | Glide avalanche (nm) |
| | | Plasma gas | Input power (W) | Reaction pressure (Pa) | Treating time (sec) | | | | | |
| --- | --- | --- | --- | --- | --- | --- | --- | --- | --- | --- |
| Ex. 1 | 0.1 | $O_2$ | 200 | 0.5 | 300 | 51 | 37 | 12.1 | 91 | 5.8 |
| Ex. 2 | 0.5 | $O_2$ | 200 | 0.5 | 300 | 22 | 18 | 13.1 | 91 | 6.1 |
| Ex. 3 | 1 | $O_2$ | 200 | 0.5 | 300 | 4 | 3 | 14.2 | 87 | 6.1 |
| Ex. 4 | 3 | $O_2$ | 200 | 0.5 | 300 | 1 | 2 | 13.9 | 90 | 6.3 |
| Ex. 5 | 5 | $O_2$ | 200 | 0.5 | 300 | 3 | 3 | 14.0 | 89 | 6.5 |
| Ex. 6 | 10 | $O_2$ | 200 | 0.5 | 300 | 2 | 3 | 14.1 | 93 | 6.6 |
| Ex. 7 | 14.5 | $O_2$ | 200 | 0.5 | 300 | 1 | 3 | 14.3 | 92 | 7.0 |
| Ex. 8 | 15 | $O_2$ | 200 | 0.5 | 300 | 2 | 2 | 14.1 | 84 | 6.9 |
| Ex. 9 | 17 | $O_2$ | 200 | 0.5 | 300 | 3 | 3 | 13.9 | 88 | 9.7 |
| Ex. 10 | 20 | $O_2$ | 200 | 0.5 | 300 | 1 | 2 | 13.8 | 87 | 13.2 |
| Ex. 11 | 25 | $O_2$ | 200 | 0.5 | 300 | 3 | 1 | 13.2 | 84 | >15.0 |
| Co. Ex. 1 | 0 | $O_2$ | 200 | 0.5 | 300 | 58 | 49 | 11.4 | 74 | 5.9 |
| Co. Ex. 2* | — | — | — | — | — | — | — | 9.2 | 56 | 5.2 |

*Comparative Exmple 2: modification treatment was not conducted

As seen from Table 1, the magnetic recording medium made by the process of the present invention exhibits excellent RW characteristics such as SNR and T-squash, and stable head-floating characteristics. That is, the magnetic recording medium has a good surface smoothness and exhibits good separability between the adjacent tracks in the magnetic layer by the non-magnetic partition regions.

INDUSTRIAL APPLICABILITY

According to the making process of the present invention, a magnetic recording medium exhibiting excellent separability for magnetic recording pattern, where signals are not interfered between the adjacent pattern regions, and further exhibiting excellent high-density characteristics, can be made with a high efficiency. This magnetic recording medium has a smooth surface, and therefore, a magnetic recording-reproducing apparatus such as a magnetic disk apparatus, made therefrom, exhibits a low floatability of the magnetic head.

modified magnetic characteristics is not larger than 50% of the coercive force of the other regions of the magnetic layer having the non-modified magnetic characteristics.

2. The process for making a magnetic recording medium according to claim 1, wherein the surface layer portions to be removed in the step (2) have a thickness of in the range of 0.1 nm to 15 nm.

3. The process for making a magnetic recording medium according to claim 1, wherein the reactive plasma or the reactive ion contains an oxygen ion.

4. The process for making a magnetic recording medium according to claim 1, wherein the reactive plasma or the reactive ion contains a halogen ion.

5. The process for making a magnetic recording medium according to claim 4, wherein the halogen ion is a halogen ion formed by introducing a halogenated gas into the reactive plasma, said halogenated gas being at least one halogenated gas selected from the group consisting of $CF_4$, $SF_6$, $CHF_3$, $CCl_4$ and KBr.

6. The process for making a magnetic recording medium according to claim 4, wherein the halogen ion is a fluorine ion.

7. A process for making a magnetic recording medium having a magnetically partitioned magnetic recording pattern, which is characterized by comprising the following seven steps (1) through (7), conducted in this order:
  (1) a step of forming a magnetic layer on a non-magnetic substrate;
  (2) a step of forming a masking layer on the magnetic layer;
  (3) a step of forming a resist layer on the masking layer;
  (4) a step of forming on the resist layer a magnetic recording pattern for partitioning the magnetic layer into divided regions;
  (5) a step of removing the masking layer in the regions corresponding to the magnetic layer-partitioning regions in the magnetic recording pattern;
  (6) a step of removing surface layer portions of the regions of the magnetic layer by ion milling, which regions have been exposed by the removal of the regions of masking layer in step (5); and
  (7) a step of exposing the regions of the magnetic layer, from which the surface layer portions have been removed in step (6), to a reactive plasma or a reactive ion, thereby modifying magnetic characteristics of the regions of the magnetic layer, while magnetic characteristics of other regions of the magnetic layer are not modified, whereby a magnetic recording pattern is formed which is magnetically partitioned by the regions of the magnetic layer having the modified characteristics,
  wherein exposure of the regions of the magnetic layer to the reactive plasma or the reactive ion is carried out to an extent such that the magnetization of the regions of the magnetic layer having the modified characteristics is not larger than 75% of the magnetization of the other regions of the magnetic layer having the non-modified magnetic characteristics, or to an extent such that the coercive force of the regions of the magnetic layer having the modified magnetic characteristics is not larger than 50% of the coercive force of the other regions of the magnetic layer having the non-modified magnetic characteristics.

* * * * *